United States Patent
Agarwala et al.

(10) Patent No.: US 7,577,774 B2
(45) Date of Patent: *Aug. 18, 2009

(54) INDEPENDENT SOURCE READ AND DESTINATION WRITE ENHANCED DMA

(75) Inventors: Sanjive Agarwala, Richardson, TX (US); Kyle Castille, Houston, TX (US); Quang-Dieu An, Plano, TX (US); Hung Ong, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 368 days.

This patent is subject to a terminal disclaimer.

(21) Appl. No.: 11/128,507

(22) Filed: May 13, 2005

(65) Prior Publication Data

US 2006/0256796 A1    Nov. 16, 2006

(51) Int. Cl.
*G06F 13/28* (2006.01)
*G06F 13/00* (2006.01)

(52) U.S. Cl. .............................. 710/24; 710/21; 710/22; 711/149; 711/168

(58) Field of Classification Search .................. None
See application file for complete search history.

(56) References Cited

U.S. PATENT DOCUMENTS

| | | | | |
|---|---|---|---|---|
| 4,470,115 A | * | 9/1984 | Wehr | 710/36 |
| 5,566,317 A | * | 10/1996 | Treiber et al. | 711/117 |
| 5,835,417 A | * | 11/1998 | Ayukawa et al. | 365/189.04 |
| 2005/0219888 A1 | * | 10/2005 | Kwon et al. | 365/94 |

* cited by examiner

*Primary Examiner*—Eron J Sorrell
*Assistant Examiner*—Dean Phan
(74) *Attorney, Agent, or Firm*—Robert D. Marshall, Jr.; Wade J. Brady, III; Frederick J. Telecky, Jr.

(57) ABSTRACT

The present invention provides for independent source-read and destination-write functionality for Enhanced Direct Memory Access (EDMA). Allowing source read and destination write pipelines to operate independently makes it possible for the source pipeline to issue multiple read requests and stay ahead of the destination write for fully pipelined operation. The result is that fully pipelined capability may be achieved and utilization of the full DMA bandwidth and maximum throughput performance are provided.

4 Claims, 4 Drawing Sheets

INDEPENDENT SOURCE READ AND DESTINATION WRITE ENHANCED DMA

TECHNICAL FIELD OF THE INVENTION

The technical field of this invention is direct memory access units in data processing devices.

BACKGROUND OF THE INVENTION

Current microprocessor designs need to centralize data transfer operations under control of integrated functional units known as data transfer access units or enhanced direct memory access (EDMA) units. EDMA is of most interest here and specifically of interest are EDMA designs employing hub-and-port style architecture. Such EDMAs feature a hub unit, which maintains a queue of transfer requests and provides priority protocol and proper interfacing for the handling of a large number of such requests. Secondly hub-and-port EDMAs have one or more hub interface units (HIU), which each provide a seamless interface between the EDMA hub and its ports. Ports are typically external application units (AU) otherwise known as peripheral units. Internal memory ports are also included among the EDMA ports.

FIG. 1 illustrates the essentials of a microprocessor system having EDMA 100 and central processing unit (CPU) 101. EDMA 100 includes transfer controller 102 and hub interface units (HIU) 104, 105, and 106. Communication between the transfer controller hub unit 102 and HIUs 104, 105, and 106 employs buses 103, 107, 108, 109, and 110. Each HIU provides interface to a single port. Peripheral unit 114 and 115 communication with corresponding HIUs 104 and 105 via respective paths 111 and 112. Each EDMA port also includes the internal memory port device 116 which communications with HIU 106 via path 113. The EDMA 100 responds to transfer requests not only from CPU 101 but also from any of the ports it services. Transfer requests (TR) handled by transfer controller (TC) hub unit 102 involve transfer of data from one port to another. Transfer commands reside in transfer request packets that give all the detailed parameters of a transfer.

FIG. 2 illustrates the functional units of the transfer controller portion of EDMA 200. The transfer request processor 201 receives transfer requests from CPU 230 and from one or more HIU 210 via path 228. Transfer request processor passes these requests to queue manager 202. Queue manager 202 receives data transfer request packets (TRP), places them in queue manager RAM 203 and assigns them to one of the P channel priority levels. It is helpful to distinguish TRPs stored in the queue manager RAM 203 as being in the queue, and TRPs stored in the channel registers block 204 as being active. For example, for N=32, EDMA 200 could have four channel priorities and channel register block 204 could hold eight active transfer packets at each priority level. At any given time channel register block 204 could hold up to 32 total TRPs.

If there is no channel available for direct processing of a TRP coming into queue manager 202, it is stored in queue manager RAM 203. The TRP is then submitted to the channel registers 204 at a later time when a channel becomes available. Source ready signal 213 and destination ready signal 215 indicate availability of a channel space within the channel registers 204. Channel registers 204 interface with source pipeline 205 and destination pipeline 206. Source pipeline 205 and destination pipeline 206 are address calculation units for source (read) and destination (write) operations. These pipelines broadcast outputs to M ports of EDMA 200 through M hub interface units 210, which drive the M possible external ports units. FIG. 2 illustrates just one port 229 as an example. When source pipeline space is available, source pipeline 204 passes source ready signal 216 to the channel registers 204, which passes source ready signal 213 to queue manager 202. When destination pipeline space is available, destination pipeline 206 passes ready signal 219 to the channel registers 204, which passes ready signal 215 to queue manager 202. Queue manager block 202 passes source read commands developed from the transfer packets to channel registers 204 via path 214 and hence to source pipeline 205 via path 217. Queue manager block 202 passes destination write commands developed from the transfer packets to channel registers 204 via path 214 and hence to destination pipeline 205 via path 220. Source valid signal 218 and destination valid signal 221 from channel registers 204 alert the respective pipelines that a valid transfer is ready to be processed.

Signals broadcast from transfer controller (TC) to the hub interface units (HIU) 210 and returning from the HIU to the TC include: source read command 222; destination write command 223; destination write data 224; read response information 227 from HIU to read response FIFO buffer 212; read return data from ports 225 to be stored in write data FIFO buffer 211; TC acknowledge flag 226 from response acknowledge logic 209 to HIU 210.

FIG. 3 illustrates queue manager 300 and its interface within the EDMA hub unit to channel registers 304, source pipeline 305 and destination pipeline 306. Channel parameters registers 301 and port parameters registers 302 store critical data regarding, for example, types of transfers, mode information, status, and other information critical to the transfer process. Channel registers 304 pass information used in source pipeline 305 for generation of the read commands 322. Similarly channel registers 304 pass information used in destination pipeline 306 for the generation of write command 324 directing passage of write data 323 to the HIU. Read data 325 and read response information 327 from the port returns to destination pipeline 306 via data router unit 310. Data router unit 310 includes the two FIFOs, write data FIFO buffer 311 and read response FIFO buffer 312. Response acknowledge logic 309 generates response acknowledge (ACK) signal 326 to the HIU that the data read has been received.

When a channel register 304 within the EDMA is empty, a data request, either source ready 318 or destination ready 319, is sent for that channel to queue manager 300. If queue manager 300 has another EDMA entry for that channel, then it reads out the transfer request packet for that transfer and sends it via path 320 to channel registers 304. This information is saved in the appropriate channel, and that channel is activated inside the channel registers, to begin transferring data. During the transfer, the source and destination pipelines incrementally modify some of the transfer parameters and send out the updated values to the rest of the EDMA. Once the EDMA finishes processing that channel, the channel registers will receive a source ready signal 328 or a destination ready signal 329. Queue manager 300 then detects the completion of a transfer and acts to send another request to channel registers 304.

SUMMARY OF THE INVENTION

The present invention provides for independent source-read and destination-write functionality for the Enhanced DMA. Allowing source read and destination write to operate independently makes it possible for the source pipeline to issue multiple read requests and stay ahead of the destination write for fully pipelined operation. The result is that fully pipelined capability may be achieved and utilization of the full DMA bandwidth and maximum throughput performance are provided.

BRIEF DESCRIPTION OF THE DRAWINGS

These and other aspects of this invention are illustrated in the drawings, in which.

DETAILED DESCRIPTION OF PREFERRED EMBODIMENTS

The enhanced DMA (EDMA) system executes each data transfer in a sequence as follows: (a) EDMA issues a read command to a source port; (b) the source port returns data; and (c) the read data return is routed to and written to the destination port. The next new transfer request of the EDMA channel will not be serviced until the current request completes, or until all data has been written to the destination port. This invention allows the source read and the destination write to operate independently. The source pipeline can issue multiple read transfer requests and can always stay ahead of the destination write for fully pipelined operation.

Figure 1:
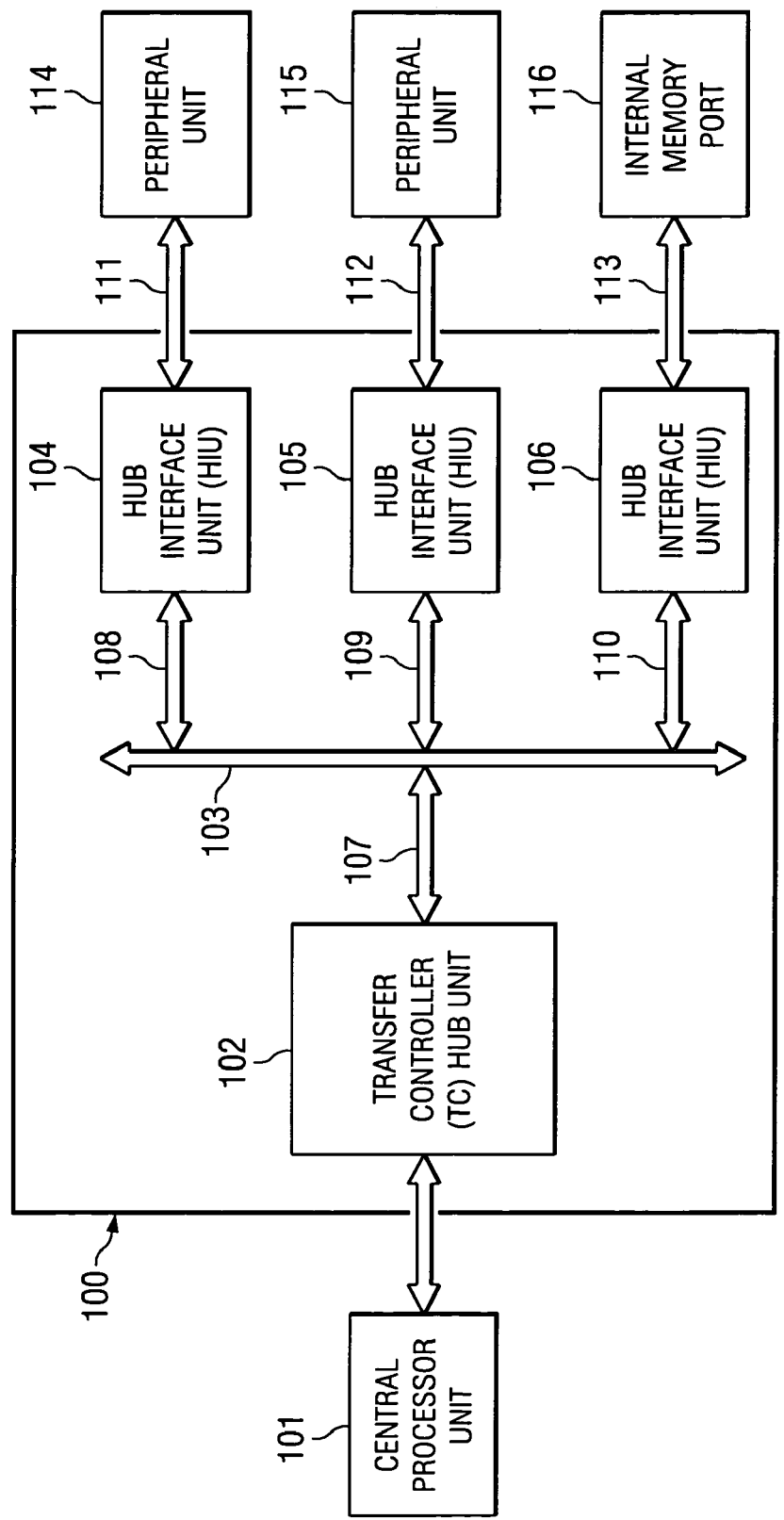
FIG. 1 illustrates the high level functional diagram of an enhanced direct memory access unit (EDMA) with hub-and-port architecture driven by a central processor unit and having a transfer controller interfacing with several hub interface units driving peripheral unit functions (Prior Art)
Figure 2:
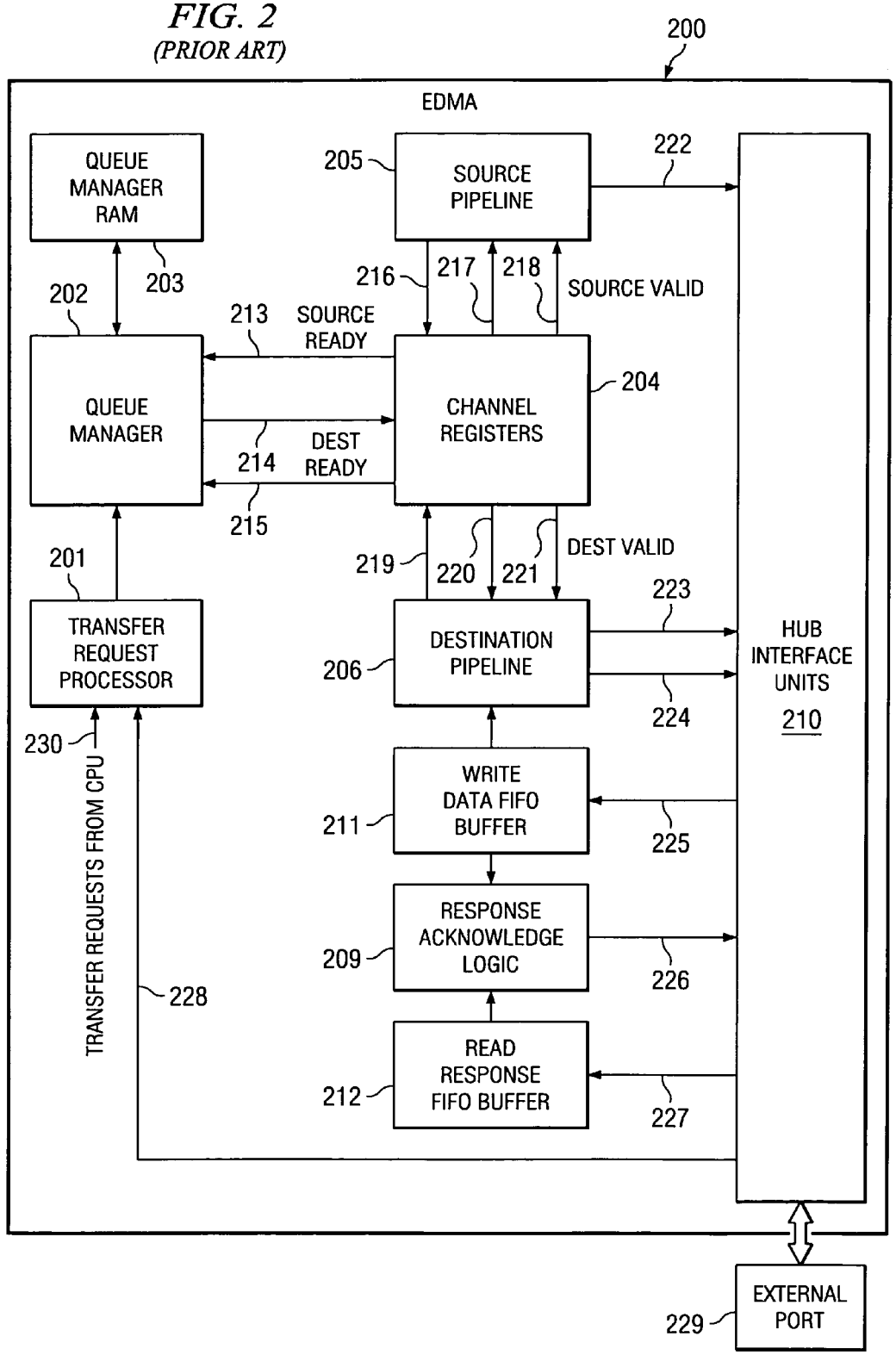
FIG. 2 illustrates in a functional block diagram the basic principal features of the EDMA (Prior Art)
Figure 3:
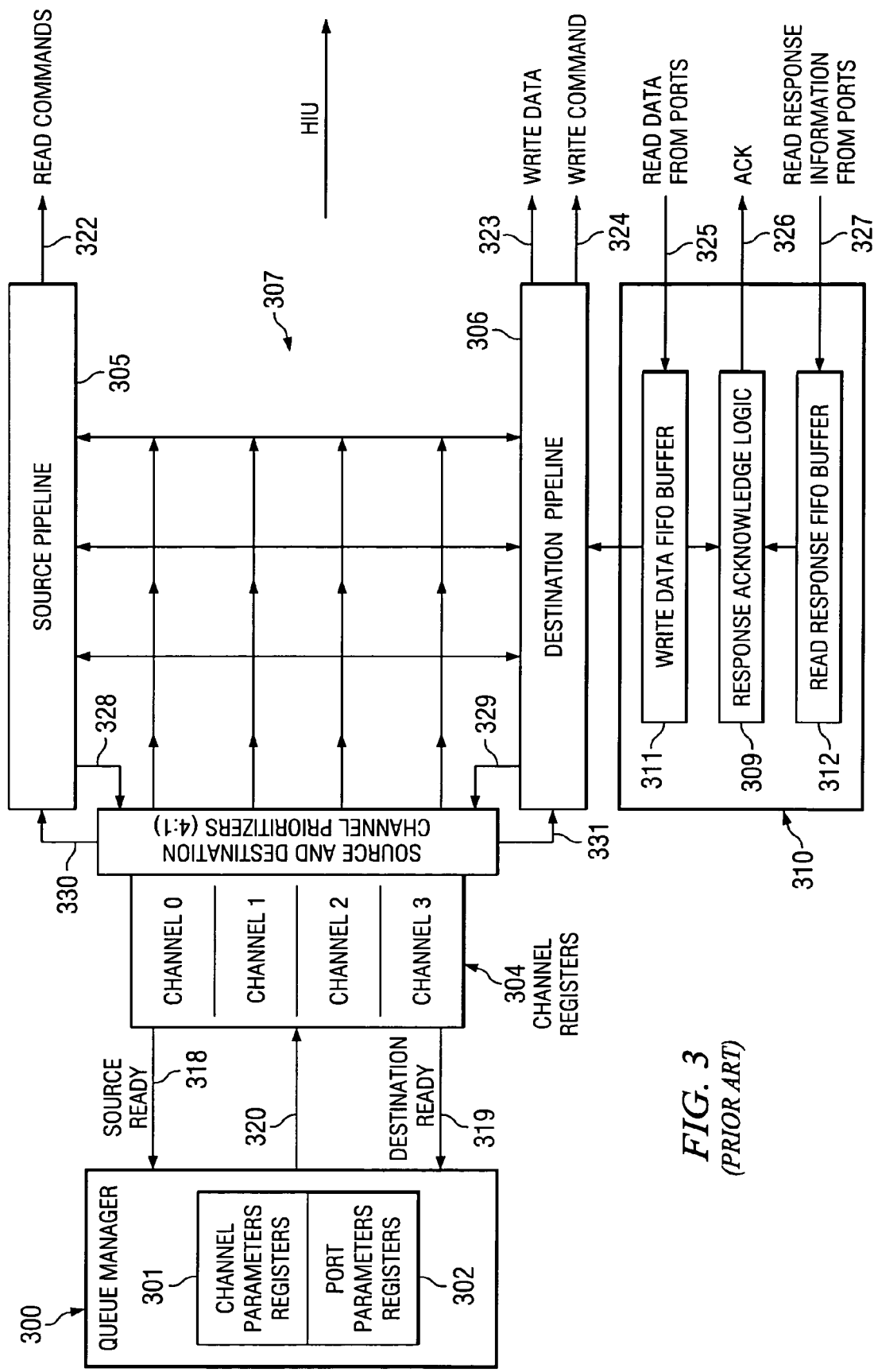
FIG. 3 illustrates the queue manager interface to the EDMA source and destination pipelines (Prior Art)
Figure 4:
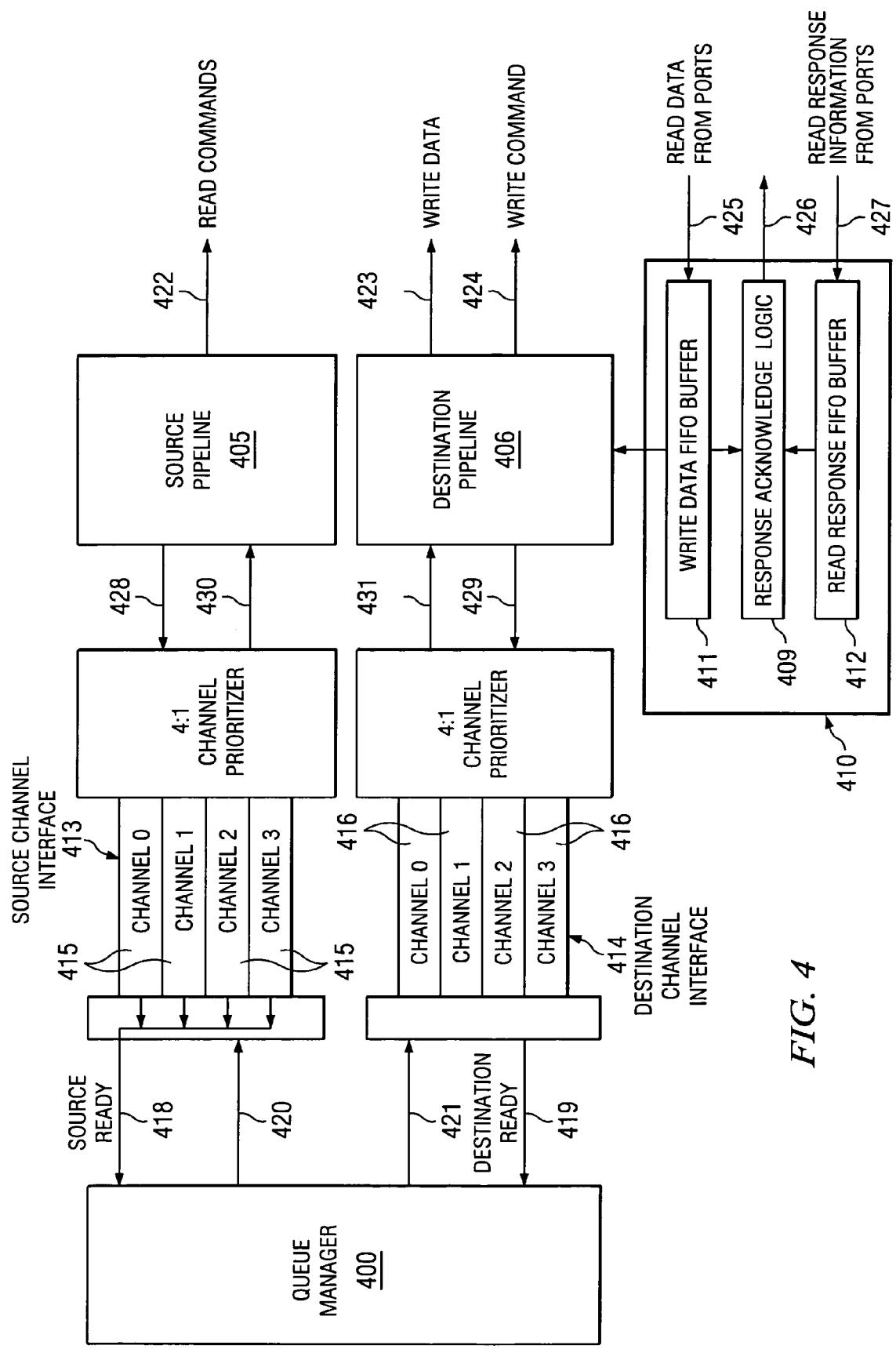
FIG. 4 illustrates the independent source and destination EDMA pipelines of this invention.

To achieve fully pipelined capability, this invention uses the whole data bandwidth and maximizes the EDMA throughout. This is why this invention employs the independent source read and destination write operation approach described here. FIG. 4 illustrates the principles involved in the separation of the source and destination pipelines giving independent read write operations of the EDMA system. Each channel transfer request packet is broken into a source transfer packet 420 and a destination transfer packet 421. A source transfer packet 420 is sent to source pipeline 405. A destination transfer packet 421 is sent to destination pipeline 406. These packet transfers are completely independent. Each transfer packet operates on one and only one priority channel among a plurality of possible priority channels.

Source channel interface 413 contains all source read parameters and maintains the handshake between source channel registers 415 and source pipeline 405. Source pipeline 405 performs the read operation and issues read command 422 to the source port. Once the read transfer on one channel completes, source pipeline 405 will assert ready signal 428 to source channel interface 413 to inform it is ready to process the next read request. Source channel interface 413, in turn, signals to the queue manager 400 via source ready signal 418 that any existing new source transfer packet can be processed.

Similarly, destination channel interface 414 contains all destination write parameters and maintains the handshake between destination channel registers 416 and destination pipeline 406. Destination pipeline 406 performs the actual write operation and issues a write command 424 to the destination port along with write data 423. Read data 425 and read response information 427 from the port is returned to the destination pipeline 406 via data router unit 410. Data router unit 410 includes the two FIFOs, write data FIFO buffer 411 and read response FIFO buffer 412. Response acknowledge logic 409 supplies a response ACK 426 to the HIU that the data read has been received.

Once all the data has been written to the destination port, destination pipeline 406 asserts ready signal 429 to destination channel interface 414 to indicate it is ready to process the next write request. Destination channel interface 414, in turn, signals to queue manager 400 via source ready signal 419 that a new channel destination transfer packet can be executed if exists.

Earlier EDMA devices required that the full processing of a transfer packet, both source read and destination write had to be completed before a new transfer packet could be processed. This invention employs the following concept. Any waiting read command is always issued before a write command. By breaking the EDMA transfer request into independent read and write transfer requests, source pipeline 405 is able to issue multiple read commands even though the write portion of those transfer packet has not completed. Destination pipeline 406 is aware of the current channel transfer information, which guarantees that the write data will not be out of order. Fully pipelined capability is thereby achieved, the whole data bandwidth is utilized and thus the EDMA performance is maximized.

What is claimed is:

1. An enhanced direct memory access unit comprising:
    a plurality of ports, each port operating to perform at least one of supplying data as a source port or receiving data as a destination port and at least one port operating to perform both supplying data as a source port and receiving data as a destination port;
    a queue manager receiving and prioritizing data transfer requests, each data transfer request specifying a source port, a destination port and an amount of data to transfer from said source port to said destination port, said prioritizing including for each data transfer request assigning a data source channel and separately and independently assigning a data destination channel;
    a plurality of source channel registers storing data corresponding to a plurality of data source channels;
    a source pipeline supplying a read command to a source port specified in a data transfer request under control of a corresponding one of said source channel registers;
    a plurality of destination channel registers storing data corresponding to a plurality of destination channels, each of said destination channel registers different from each of said source channel registers;
    a destination pipeline supplying write command and write data to a destination port specified in a data transfer request under control of a corresponding one of said destination channel registers; and
    said queue manager initiating in response to a second data transfer request a second source read command in said same data source channel of said first data transfer request after completion of a first source read command in response to a first data transfer request and before completion of the corresponding destination write command in the assigned data destination channel of said first data transfer request.

2. The enhanced direct memory access unit of claim 1, further comprising:
    each of said plurality of source channel registers transmits a source ready signal to said queue manager when said corresponding source channel is available; and said queue manager transmits a source transfer request to a source channel register following receipt of said source ready signal from said corresponding source channel register.

3. A method of data transfer comprising the steps of:

receiving and prioritizing data transfer requests, each data transfer request specifying a source port, a destination port and an amount of data to transfer from said source port to said destination port, said prioritizing including for each data transfer request assigning a data source channel and separately and independently assigning a data destination channel;

storing data for a plurality of data source channels in a plurality of corresponding source channel registers;

supplying a read command to a source port specified in a data transfer request under control of a corresponding one of said source channel registers;

storing data for a plurality of destination channels in a plurality of corresponding destination channel registers, each of said destination channel registers different from each of said source channel registers;

supplying write command and write data to a destination port specified in a data transfer request under control of a corresponding one of said destination channel registers; and initiating in response to a second data transfer request a second source read command in said same data source channel of said first data transfer request after completion of a first source read command in response to a first data transfer request and before completion of the corresponding destination write command in the assigned data destination channel of said first data transfer request.

4. The method of claim 3, further comprising the steps of:

transmitting a source ready signal to a queue manager when said corresponding source channel is available; and transmitting a source transfer request to a source channel register from said queue manager following receipt of said source ready signal from said corresponding source channel register.

* * * * *